June 7, 1960 J. S. WROBY 2,939,720
ROAD NOISE ISOLATION MEANS FOR A MOTOR
VEHICLE SUSPENSION SUPPORT
Filed Feb. 12, 1957 4 Sheets-Sheet 1

INVENTOR
John Stan Wroby
BY
L.D. Burch
ATTORNEY

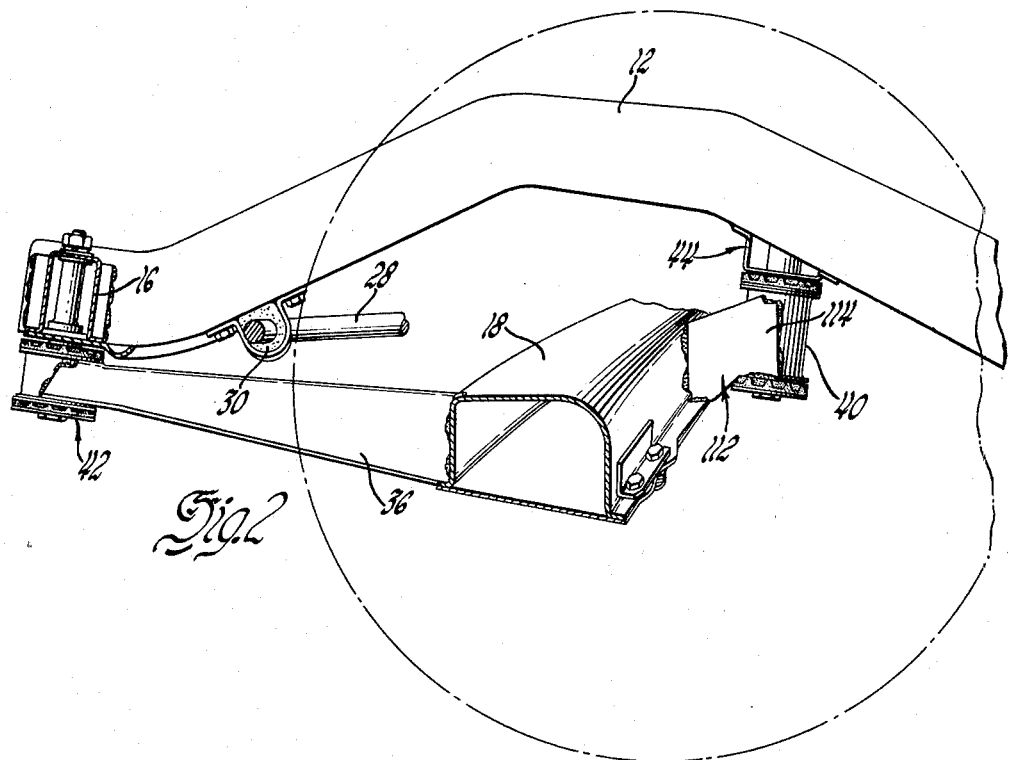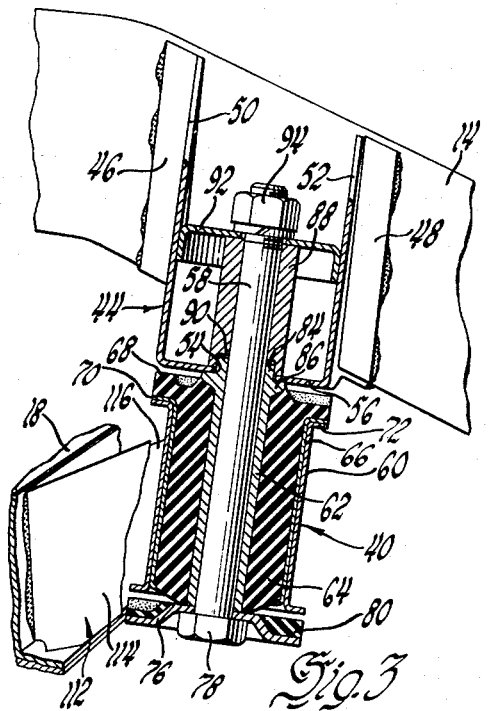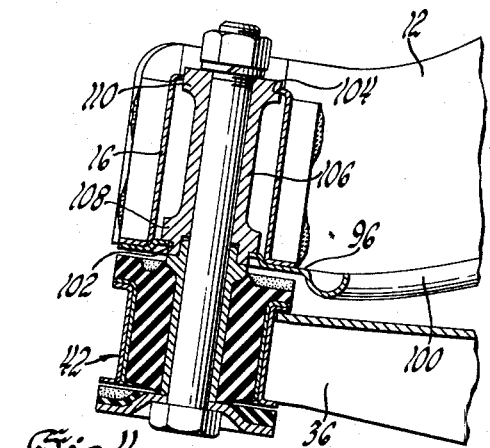

INVENTOR
John Stan Wroby
BY
ATTORNEY

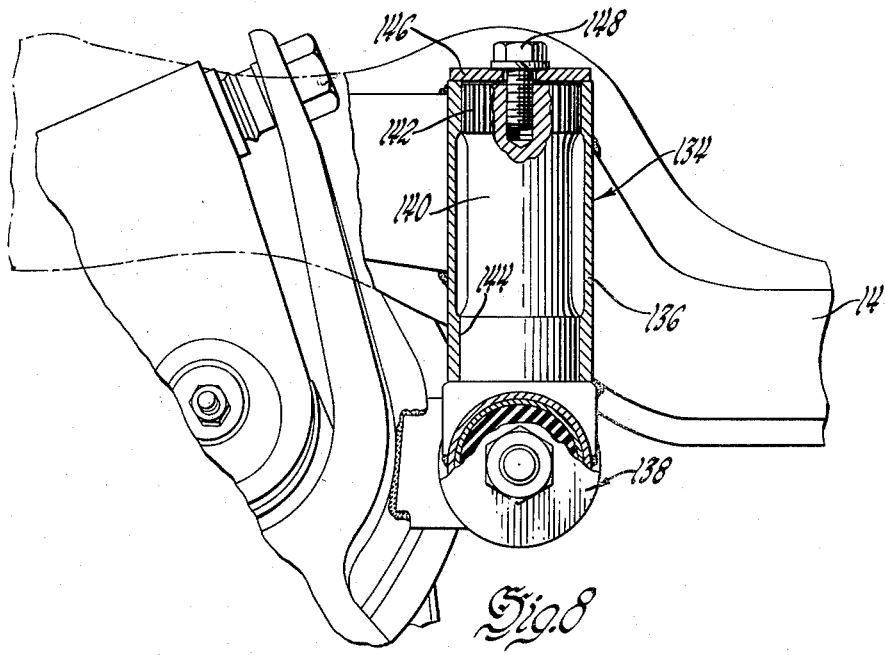
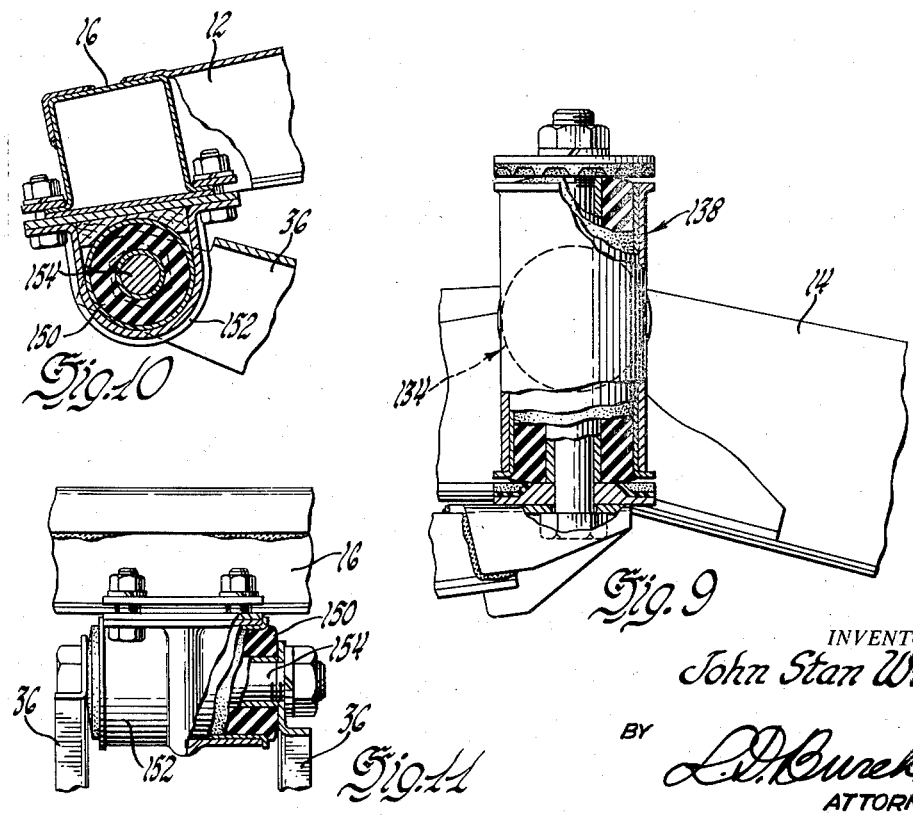
INVENTOR
John Stan Wroby
BY
ATTORNEY

United States Patent Office 2,939,720
Patented June 7, 1960

2,939,720

ROAD NOISE ISOLATION MEANS FOR A MOTOR VEHICLE SUSPENSION SUPPORT

John Stan Wroby, Royal Oak, Mich., assignor to General Motors Corporation, Detroit, Mich., a corporation of Delaware Filed Feb. 12, 1957, Ser. No. 639,694

1 Claim. (Cl. 280—106.5)

This invention relates to noise suppression means in general and more particularly to means for minimizing the transmission of road noises and other disturbances to within an automotive vehicle.

An appreciable amount of the road noise which is audible within the passenger compartment of an automotive vehicle has been found to initiate at the front end of the vehicle and particularly from the front suspension system thereof. This has suggested the use of different damper and isolation type guards and mounts within the vehicle suspension system, between suspension members, between the vehicle body and frame, and elsewhere. The most desirable location for an absorption or isolation type device has been recognized as between the member supporting the vehicle suspension system and the vehicle frame. However, presently available mounts are not considered to adequately suppress disturbances without unduly sacrificing the more important characteristic of good vehicle handling, steering ease, and best braking resistance.

It is here proposed to provide and make use of a new and different type of mount wherein the load-displacement rate of a mount may be appreciably greater in one plane of direction than in a given direction transversely thereof. This enables the use of such a mount for supporting a suspension system to a vehicle frame where a resistance to relative movement in a generally horizontal plane is desirable, for better vehicle handling, steering and braking characteristics therein, and where limited and controlled relative movement in a given direction will cope with and suppress disturbances which would otherwise be transmitted between the suspension supporting and frame members.

The preferred embodiment of the present invention makes use of concentrically disposed and spaced sleeve members, which are each adapted to be secured to different of two members to be secured together, and has an annular body of resilient material radially compressed within the annular space between the sleeves. By compressing the elastomer radially, a ratio of radial to axial load-displacement rates of approximately six to one may be obtained which is a considerable improvement over presently known mounts and for the same lateral rigidity will enable use of an elastomer having a smaller natural frequency and, since the efficiency of the mount is related to the ratio of the forced frequency and natural frequency, an appreciable improvement in the suppression of disturbances will therefore be obtained.

The elastomer is preferably compounded to have some internal hysteresis and to have a natural frequency in installation which is other than the frequency of the disturbances to be isolated or such as will be subject to resonance. Road noise frequency is about 70–180 cycles per second and wheel hop disturbances are at about 11–12 cycles per second. Consequently, a natural frequency in the elastomer of 6 cycles per second, which may be used without adverse effects as regards lateral stability, since the mount has a six to one ratio of lateral to axial load-displacement rates, will be less than the disturbances and, consequently, not subject to resonance therewith.

The number and location of mounts and their disposition as used to secure a suspension supporting member to a vehicle frame will also contribute to the efficiency of the mounts as regards noise isolation. The mounts are preferably secured near the ends of the suspension support and to the vehicle frame with the upper end thereof inclined rearwardly. A stabilizing arm is best provided on the suspension member and should extend forwardly. An isolation mount for securing the stabilizing arm to the vehicle frame has been found to also contribute in minimizing the adverse effects otherwise assumed by the supporting isolation mounts in resisting braking forces.

In the drawings:

Figure 2 is a side view of the front end of the vehicle frame and suspension assembly of Figure 1 taken substantially in the plane of line 2—2 to show the forwardly extending stabilizer arm and the disposition of the isolation mounts.

Figure 3 is an enlarged cross-sectioned view of the preferred side isolation mounts.

Figure 4 is an enlarged cross-sectioned view of the stabilizer arm isolation mount.

Figure 8 is a top view of a test fixture used in determining the preferred angular disposition of the isolation mounts.

Figure 9 is a side view of a mount held to the vehicle frame by the locating fixture of Figure 10.

Figure 10 is a cross-sectioned side view of an alternate stabilizer arm mount.

Figure 11 is an end view of the alternate arm mount shown by Figure 10.

Figure 1:
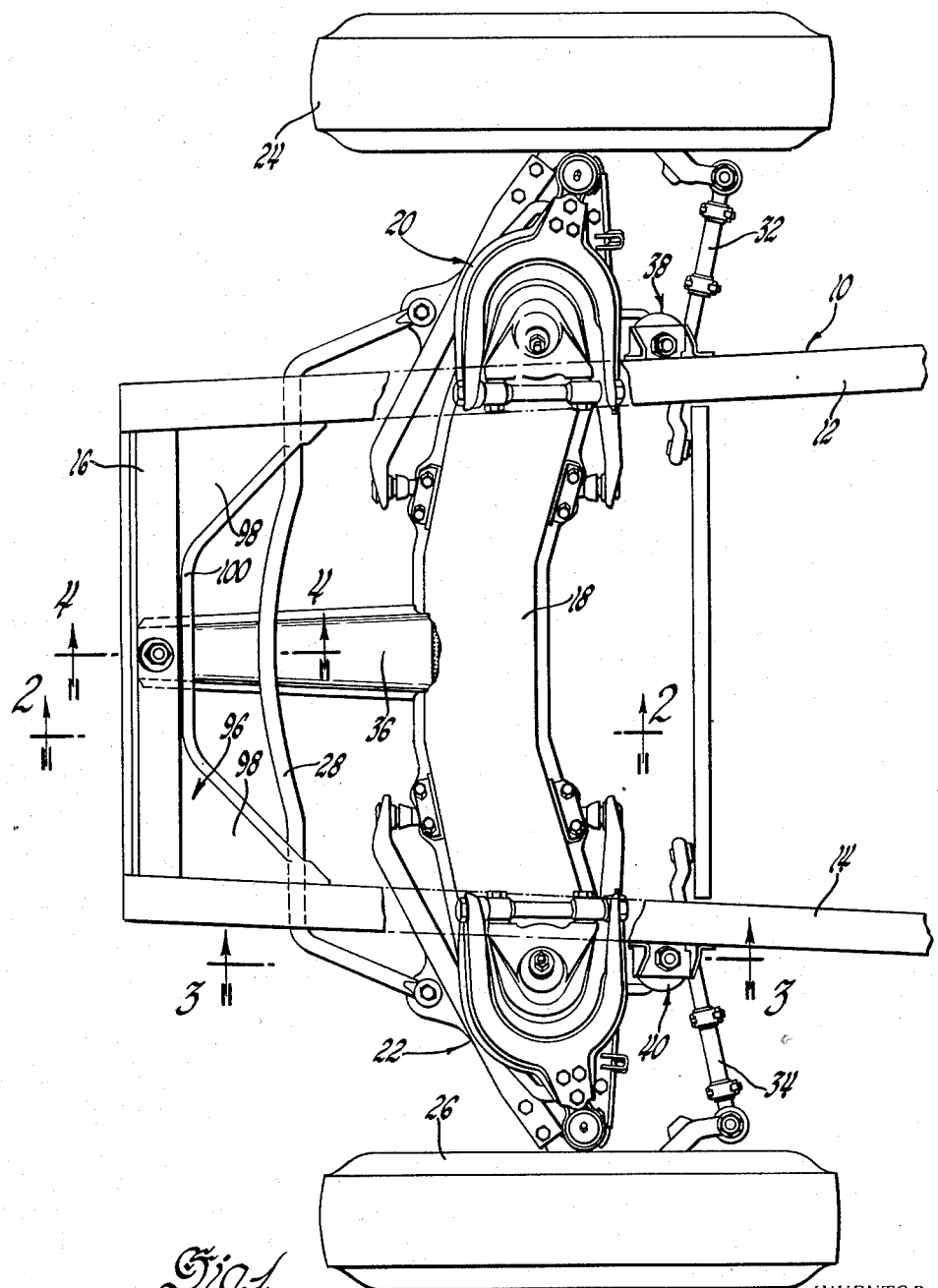
Figure 1 is a view looking down upon a vehicle frame having a suspension assembly mounted thereon with the proposed isolation mountings.

A vehicle frame section 10 is shown by the drawings to include spaced side rails 12 and 14 with a cross rail 16 secured between the adjacently disposed ends thereof. The side rails include a kicked up portion, best shown by Figure 2, within which a transversely disposed suspension supporting member 18 is mounted.

The suspension supporting member 18 is a closed box-sectioned member having individual wishbone type suspension units 20 and 22 secured to each end thereof for supporting the vehicle wheel assemblies 24 and 26, respectively. A torsion rod stabilizer bar 28 is secured between the lower wishbone members of the suspension units and extends across the frame in front of the cross member. The stabilizer bar or rod 28 is held to the frame side rails by resilient bushings 30, one of which is shown by Figure 2.

The steering links 32 and 34 are shown connected to the wheel assemblies and extending behind the cross member 18.

The suspension supporting cross member 18 includes a forwardly extending arm member 36 having the end thereof disposed just under the frame cross rail 16. The cross member is secured to the vehicle frame by isolation mounts 38 and 40 depending from the frame side rails 12 and 14 and a mount 42 located centrally of the cross rail 16 for receiving the arm 36.

The side mounts 38 and 40 are supported to the frame by brackets 44 which are shallow open ended channel members having flanges 46 and 48 formed from the inner ends of the side walls 50 and 52 thereof and welded to the outside of the frame side rails. An opening 54 is provided in the bottom wall 56 of the bracket for receiving a tie rod or bolt 58 therethrough for retaining the isolation members to the brackets.

The isolation mounts include concentrically disposed cylinders or sleeves 60 and 62 having a resilient member 64 disposed within the annular space between the cylinders. The preferred resilient element or elastomer 64 is compounded to include internal hysteresis and is disposed within the annular space in radial compression to increase the radial rate of load-deflection which is already relatively greater than is provided axially. The elastomer 64 is shown as bonded or otherwise formed about the centermost sleeve 62 and having an annular sheath 66 disposed therearound in the form of split or semi-cylindrical sections, best shown in Figure 5. The split sheath enables the elastomer to be radially compressed as it is received within the outer sleeve 60 since the outer sleeve is made to have a smaller inner diameter than the outer diameter of the sheath parts as received about the elastomer.

The loading of the elastomer in radial compression not only provides the increased radial rate of load-deflection but also avoids the lower than normal radial rate in other mounts where the elastomer is bonded within an annular space and thereby subjected to tensile forces as a consequence of molding shrinkage.

Figure 5:
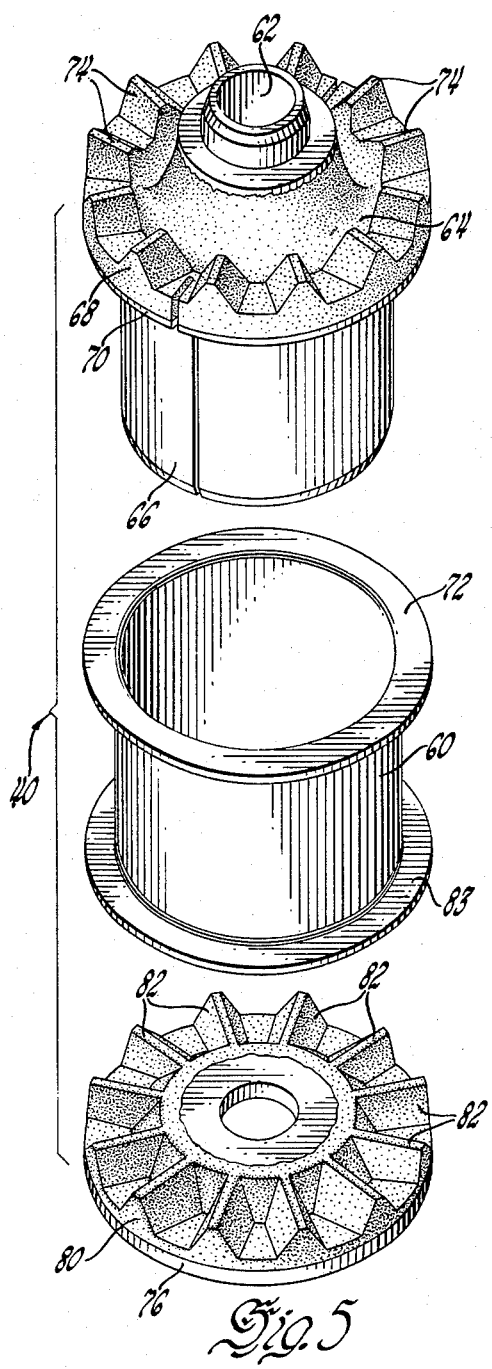
Figure 5 is an exploded perspective view of one of the isolation mounts.

The elastomer includes an annular flanged portion 68 at the upper end thereof which is received upon the outwardly flanged portions 70 and 72 of the sheath 66 and outer cylindrical sleeve 60, respectively. As best shown by Figure 5, this flanged portion includes a plurality of radially disposed ribs 74 about the periphery thereof. These ribs, in cooperation with the bottom wall of bracket 44, provide mechanical wiping and friction conducive to improved damping as well as a controlled and increasing snubbing action by rapidly increasing the axial load-deflection rate for large longitudinal deflections.

An annular disc 76, retained by the depending head 78 of the tie bolt 58, has an annular washer 80 disposed thereon of substantially the same material as the elastomer. The disc is dished to receive the head centrally therewithin and to provide a peripheral area for receiving the washer which, like the flanged portion 68 of the elastomer, includes peripherally disposed and radially extending ribs 82, best shown by Figure 5. Such ribs provide mechanical wiping and friction upon engagement with the flange 83 of the outer sleeve member for better damping at the lower end of the elastomer and an increase in the load-deflection rate for large axial deflections. The annular disc 76 has a larger diameter than the inside diameter of cylinder 60 to provide a safety measure within the mount against disassembly and in case of elastomer or bond stress fatigue or failure.

In order to retain the side isolation mounts 38 and 40 in a given relation to the brackets 44, the end of the inner cylindrical sleeve is formed to include a pilot end 84 with a collar 86 abutting the bottom wall 56 of the bracket and the pilot end received through bracket opening 54. A vertical spacer 88 is sleeved about the tie bolt 58 over opening 54 and includes a recessed end portion 90 for centering or piloting the spacer over the opening and receiving the pilot end 84 of the inner sleeve member of the isolation mount. A spacer cap 92 is received on the tie bolt over the vertical spacer and extends radially to engage bracket side walls 50 and 52 for centering the end of the bolt therebetween. A lock washer and nut 94 is threaded on the end of the tie bolt for securing the various elements of the mount in their given relative relationships. This does not affect the elastomer since the disc 76 has the end of the inner sleeve 60 abutted thereagainst.

The preferred mount 42 for the stabilizer arm is essentially the same as the side mounts 38 and 40, except as to dimensions. However, the bracket means is somewhat different in that it is formed with the cross rail 16.

The cross rail 16 is a channel member closed by a pan 96 having gussets or webs 98 extending rearwardly to engage the side rails 12 and 14 and with a strengthening bead 100 formed along its edge. An opening 102 is formed through the pan in the location receiving the front mount 42 and another opening 104, aligned therewith, is formed through the top of the cross rail. The spacer 106 is received about the tie bolt, in this instance, includes annular shoulders 108 and 110 engaged within openings 102 and 104 respectively, for centering the tie bolt and locating it in the required angular relation.

As will be noted by reference to Figures 2, 3, and 4, the side isolation mounts have the suspension supporting cross member 18 secured to the outer cylindrical sleeve 60 by a webbed bracket 112. The spaced side walls 114 and 116 of the bracket are secured to opposite sides of the outer sleeve 60 at one end and to the side wall of the cross member at the other ends thereof.

The forwardly extending arm 36 is forked at the end and has the mount 42 secured therewithin.

Figure 6:
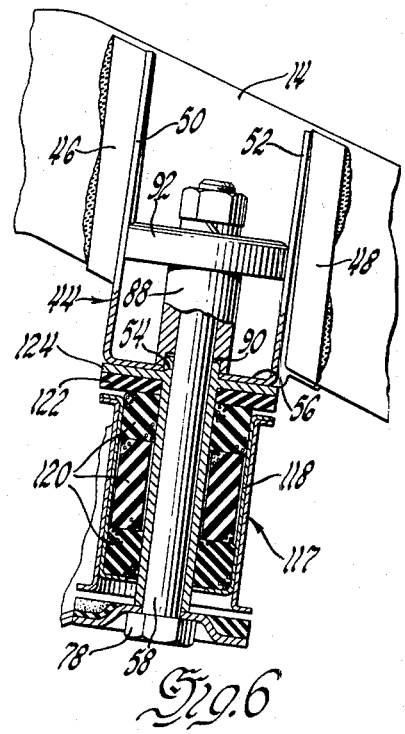
Figure 6 is a cross-sectioned view of an alternate type isolation mount.

Another acceptable isolation mount 117, adaptable for use as a side or end mount, is shown by Figure 6. The sheath member 118, in this instance, provides a pocket within which, instead of the compounded elastomer, are disposed several thick washer-like pads 120 of spring wire mesh which may be equally as well compressed radially as the preferred elastomer and have the further advantage of avoiding "packing" or permanent set within the mount. An annular washer 122 bears against the larger abutment collar 124, formed with the inner sleeve member, and in other respects the mount is essentially as has been described.

As has been mentioned, the angular relation of the proposed isolation mounts contributes to their effectiveness in providing an isolation barrier against road noises and other disturbances.

Figure 7:
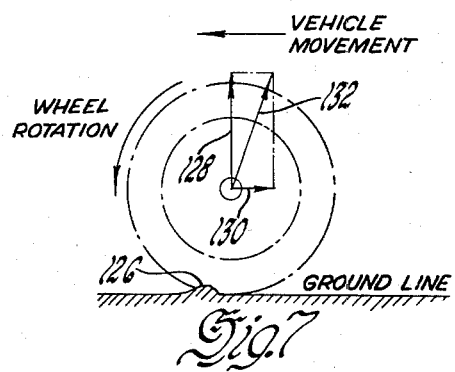
Figure 7 is a vector diagram of forces affecting the preferred angular disposition of the isolation mounts.

Referring to Figure 7, a vehicle wheel in forward motion and having a pneumatic tire, when encountering a road disturbance, as 126, is subjected to two types of forces. The larger force is primarily vertical, as represented by vector 128, and results in the deflection of the tire relative to the wheel in addition to whatever deflection may occur between the wheel and the rest of the vehicle. The tire-to-wheel deflection reduces the rolling radius of the tire and in turn produces a rotational acceleration requiring a tire ground force in a direction opposite to the motion of the vehicle, as represented by vector 130, due to the rotational inertia of the wheel and tire. This is in addition to and regardless of whether there is any similarly directed component of the vertically directed force as a result of encountering the road obstacle itself.

The vectorial sum of the vertical and rearward forces is a force, as represented by vector 132, which is exerted generally upwardly and slightly to the rear, through the wheel spindle. It is this force which is considered to cause or initiate the objectionable disturbances against which the proposed isolation barrier is to guard.

The arrangement of the isolation mounts 38, 40 and 42 is such as provides a three point support for the suspension supporting member 18 with the elastomers of each mount angularly disposed to best receive the disturbance forces. The elastomers are such as have a low axial rate for best vibration absorption and are scaled and tuned to permit only such limited and controlled relative movement between the vehicle frame and cross member in the direction of the disturbance forces as is most conducive to the absorption characteristics desired without materially effecting vehicle handling, steering, braking or the like.

The angular disposition of the side mounts is experimentally determined by the use of a fixture 134 shown in Figure 8. The fixture comprises a sleeve 136 which is secured to one of the frame side rails 12 or 14 and extends transversely thereof with one end protruding beyond the side of the rail. An isolation mount, in this instance one slightly different from those previously described and so designated 138, is secured to the end of the sleeve member by means of a post 140 which is secured to the mount and is received within the sleeve. The end of the post and sleeve are splined as at 142 in order angularly to locate the post within the sleeve and consequently to permit angular variation of the disposition of the isolation mount. A bearing surface 144 is provided within the sleeve to assist in supporting and stabilizing the post and a cap 146 and bolt 148, extending through the cap and threaded with the end of the post, locks the assembly together.

The side isolation mounts are preferably located outboard of the frame rails and are secured near the ends of the suspension supporting member, behind and as near the line of wheel action as is practical. The side mounts are tilted rearwardly relative to the spindle of the wheel although they are not located directly over the spindles. In the present instance the angular disposition is 7½ degrees from the vertical plane.

The front mount is preferably tilted the same as the side mounts to facilitate manufacture and assembly. The control and tuning of the front mount is not so critical as that of the side mounts since its distance from the line of action of the disturbance force requires a resistance of much smaller magnitude. The front mount is principally dependent upon the consideration of other forces it must withstand in other operating conditions, principal of which is vehicle braking.

An acceptable front mount is shown by Figures 10 and 11 to include an elastomer 150 held to the cross rail 16 by a U-clamp 152 with the forked ends of the stabilizer arm 36 at each end and held by the tie bolt 154.

The use of isolation mounts of the type proposed, which are formed by concentric cylinders having an elastomer therebetween, provides an initial radial over axial load-displacement advantage in that the radial loads are taken primarily in compression and the axial loads primarily in shear. Having the elastomer compressed rather than bonded between the concentric cylinders has the further advantage of avoiding tensile forces due to rubber shrinkage in molding, which affects the radial rate, and also provides an elastomer having an improved ratio of radial to axial rates. These factors enable the design of a mount having the same or greater lateral rigidity, an improved axial softness, and a lower axial natural frequency for a considered improvement as regards isolating road noises and other disturbances from the vehicle frame.

I claim:

In combination, a vehicle frame, suspension support means for use with said frame, and mounting means for securing said suspension support means to said frame; said vehicle frame including spaced side rails extending longitudinally of said vehicle, and a cross rail secured to and extending between adjacently disposed ends of said rails; said suspension support means including a support member transversally disposed relative to said side rails and having individual wheel suspension units disposed upon the ends thereof, and an arm member secured to said support member and extended to and under said cross rail; said mounting means including concentrically disposed outer and inner cylindrical sleeves having an annular space provided therebetween, a resilient annular sleeve bonded to said inner sleeve and being in radial compression with said outer sleeve as disposed within said annular space, means for securing said outer sleeve to said support member, means for securing said inner sleeve to one of said side rails, and means secured to one of said cylindrical sleeves and extending over and adjacent each end of the other of said cylindrical sleeves for limited relative movement between said cylindrical sleeves, said means including a resilient member having spaced and transversely disposed ribs providing an increasing axial load-deflection rate upon engagement with said other cylindrical sleeve; said mounting means isolating vibrations received by said suspension support means and preventing transmission thereof to said vehicle frame.

References Cited in the file of this patent

UNITED STATES PATENTS

| | | |
|---|---|---|
| 2,233,110 | Piron | Feb. 25, 1941 |
| 2,383,645 | Hahn | Aug. 28, 1945 |
| 2,560,627 | Boschi | July 17, 1951 |
| 2,611,627 | Reynolds | Sept. 23, 1952 |
| 2,738,985 | Paton | Mar. 20, 1956 |
| 2,751,992 | Nallinger | June 26, 1956 |